United States Patent
Greenberg et al.

[15] 3,697,869
[45] Oct. 10, 1972

[54] SYSTEM FOR GENERATING COMPENSATING SIGNALS FOR MAGNETIC EFFECTS OF AIRCRAFT ON MAD SYSTEM

[72] Inventors: Myron M. Greenberg, Warminster, Pa.; Steven A. Macintyre, Reston, Va.

[73] Assignee: The United States of America as represented by the Secretary of the Navy

[22] Filed: Sept. 23, 1970

[21] Appl. No.: 74,573

[52] U.S. Cl. .............................................. 324/43 R
[51] Int. Cl. .............................................. G01r 33/02
[58] Field of Search.............324/43 R, 47, 4, 8, .5 E

[56] References Cited

UNITED STATES PATENTS

| | | | |
|---|---|---|---|
| 2,697,186 | 12/1954 | Anderson | 324/43 R |
| 2,706,801 | 4/1955 | Tolles | 324/43 R |
| 2,802,983 | 8/1957 | Tolles | 324/43 R |
| 3,441,841 | 4/1969 | Salvi et al. | 324/43 R |
| 3,530,375 | 9/1970 | Passier | 324/43 R |

Primary Examiner—Robert J. Corcoran
Attorney—R. S. Sciascia and Henry Nansen

[57] ABSTRACT

A compensation system for neutralizing an aircraft's magnetic effects on a magnetic anomaly detector system by generating compensating magnetic signals to neutralize the aircraft's magnetic effects on the detector system. Three sets of flux gate sensors or three total field sensors generate electrical signals of a magnitude indicative of a sensed magnetic field. The electrical signals are operated upon to provide compensating signals equal and opposite to an aircraft's magnetic effects on a magnetic anomaly detector.

4 Claims, 3 Drawing Figures

PATENTED OCT 10 1972                                           3,697,869

*INVENTOR.*
MYRON M. GREENBERG
STEVEN A. MACINTYRE

BY

*ATTORNEY*

SYSTEM FOR GENERATING COMPENSATING SIGNALS FOR MAGNETIC EFFECTS OF AIRCRAFT ON MAD SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention generally relates to magnetic anomaly detector systems, and more particularly, to improvements in such systems for providing compensation for an aircraft's magnetic effects on the detector system.

The magnetic properties of an aircraft are equivalent to three mutually orthogonal sources of magnetic fields of some magnitude and distance from the MAD sensor. In reality, the positions and magnitudes of these magnetic fields are dependent upon a plurality of sources within the aircraft created by aircraft structure, cargo, motion, direction, etc. These individual fields are continuously changing position and magnitude.

In magnetic anomaly detector systems, aircraft are equipped with extremely sensitive magnetic field sensing devices. Present devices available are able to measure field changes as low as $10^{-7}$ gauss (0.01 gammas) but the presence, motion and cargo of the aircraft carrying such device prevent the maximum exploitation of this measuring capability. This invention is intended to nullify the aircraft's magnetic effects and thus approach the magnetic anomaly detector sensor resolution as the limiting factor in the system's detection capability.

Previous systems have attempted by the use of a magnetic gradiometer to neutralize the effect of an aircraft on the MAD system. Such previous systems however have not compensated for the shift in location of any object causing a magnetic disturbance. Major shifts in both magnitude and location may in some cases be expected due to the deployment of weapons.

SUMMARY OF THE INVENTION

Accordingly, it is a general purpose of the present invention to provide an improved system for compensating for the magnetic disturbances of an aircraft on a MAD system. It is a further object to provide compensation not only for constant components that provide magnetic effects but also for changes in magnetic effects when the disturbance varies in both magnitude and distance from the MAD detector.

This is obtained by the use of flux gate sensors which provide electrical signals of a magnitude indicative of the component of magnetic field parallel to their magnetic axes. A three-axes sensor comprises three mutually orthogonal flux gate sensors with each flux gate sensor measuring a single independent component of the magnetic field.

By using three of the three-axes sensors, the effects of all of the combined sources of magnetic disturbances within the aircraft can be determined. The sensors generate electrical signals indicative of the magnitude of the magnetic signals obtained by the three sensors and supply these electrical signals to a system that processes these signals and supplies electrical signals to an external flux generator in order to compensate for the magnetic signals introduced by the presence of the aircraft.

It should be kept in mind that the three sensors in addition to sensing the magnetic field of the aircraft will sense the earth's magnetic field. However, since the sensors for all practical purposes detect the same earth magnetic signals and are processed through differential amplifiers the component of the signal attributed to the earth's magnetic field is canceled.

DESCRIPTION OF THE PREFERRED EMBODIMENT

Figure 1:
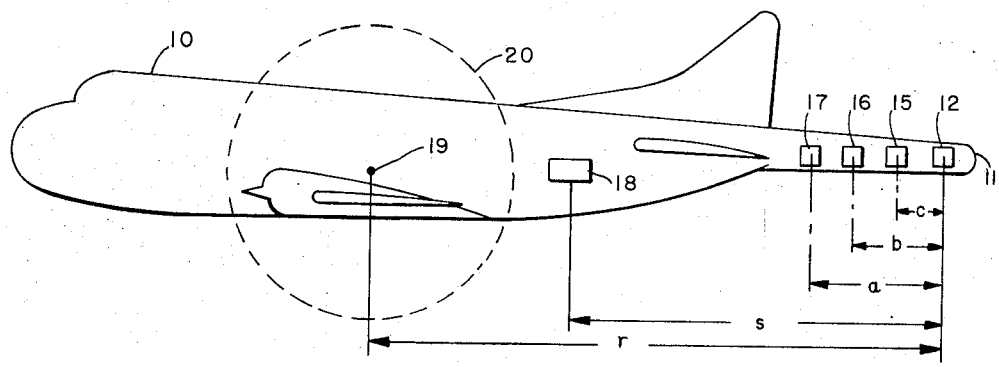
FIG. 1 is a side elevation view of an aircraft showing the approximate location of the generating and sensing components of a preferred embodiment according to the present invention.

Referring now to FIG. 1 there is shown an aircraft 10 with a tail boom 11 having a MAD detecting head 12 and sensor C 15, and sensor B 16 and sensor A 17 located respective distances c, b and a from MAD detecting head 12. A flux generator 18 which may be wound coils is located a distance s from MAD detecting head 12 and a flux source 19 is located a distance r from MAD detecting head 12. The flux source 19 is a fictitious source representative of all the magnitudes and positions of the plurality of magnetic sources within the aircraft. The location of the flux source 19 varies from aircraft to aircraft and at times shifts within the same aircraft. It is, however, normal to find such source within a spherical region referred to as the magnetic centroid 20. Sensors 15, 16 and 17 each have three mutually orthogonal flux gate sensors. However, only one axis will be considered since the treatments of the other two axes are identical.

Figure 2:
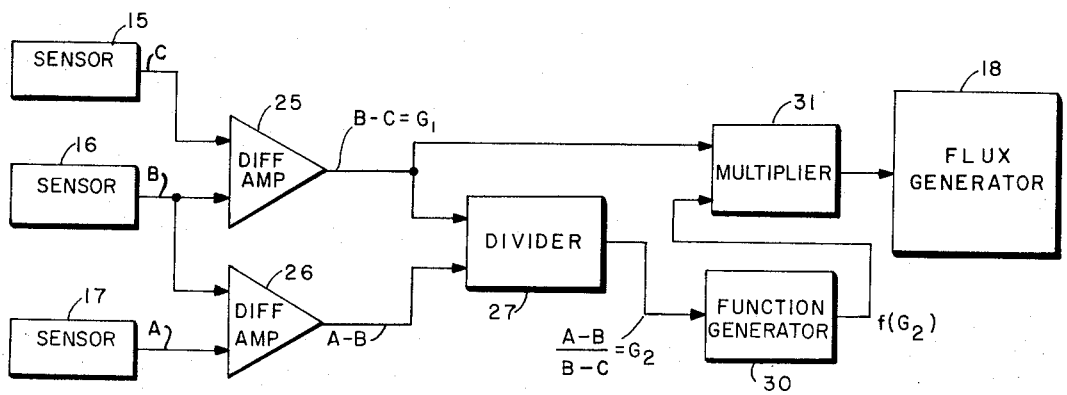
FIG. 2 is a block diagram of a system for compensating the effects of the field generated by the aircraft of FIG. 1.

Referring now to FIG. 2, sensor 17, sensor 16 and sensor 15 receive signals from the earth's magnetic field and also from the aircraft. The sensors generate electrical signals A, B and C of a magnitude indicative of the magnitude of the received magnetic signal. The electrical signals from sensor 15 and sensor 16, respectively, are applied to differential amplifier 25 which performs the operation of subtracting the signal C from the signal B and gives an output signal B–C referred to as the gradient $G_1$. Differential amplifier 26 has applied to it signal B from sensor 16 and signal A from sensor 17 and generates a signal A–B. Since it is assumed that all sensors receive the same signal from the earth's magnetic field the difference signals B – C and A – B have the earth's magnetic field signal canceled out and as a result have only a gradient signal from the magnetic variations introduced by the aircraft. The signal B – C ($G_1$ in the mathematical analysis) is applied directly to multiplier 31. Both signals A – B and B – C are applied to a typical divider circuit 27 which provides an output signal (A–B)/(B–C) ($G_2$ in the mathematical analysis) and is applied to the function generator 30 which gives an output signal $f(G_2)$ equal to a function of $G_2$.

Figure 3:
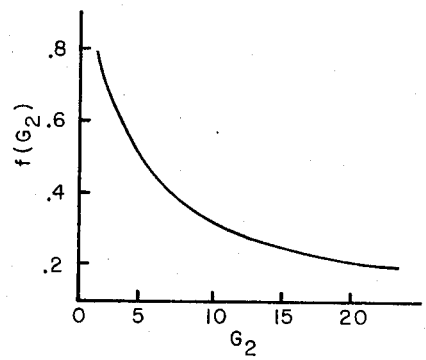
FIG. 3 is a typical graph showing the input and output characteristics of a function generator included in the system of FIG. 2.

The function generator 30 may be a programmed computer or a servo motor driving a cam to position a potentiometer, or any other known method of obtaining the function. A typical graph indicative of the respective magnitudes of the input and output signals of function generator 30 is shown in FIG. 3. The output of function generator 30 is represented as $f(G_2)$.

Multiplier 31 receives input signals from both differential amplifier 25 and function generator 30. The multiplier 31 provides an output which is the product of the two input signals and is equal to $G_1 f(G_2)$. This signal is applied to a coil of flux generator 18 so that a compensating flux for the variations in the magnetic field introduced by the aircraft is generated to cancel out the aircraft's magnetic effects on the magnetometer 12.

A mathematical analysis of the operation of the device will now be described with reference to the FIGURES.

Let $M_1$ = dipole moment of flux source 19.
Let $M_2$ = dipole moment of flux generator 18.
Therefore the field seen at the MAD detecting head is then:

$$H_{MAD} = (M_1/r^3) - (M_2/s^3)$$

$$M_2 = (M_{1s}{}^3/r^3) - s^3 H_{MAD} \quad (1)$$

The fields measured by the sensors 15, 16 and 17 are:

$$H_A = H_{AR} - H_{AS} = \frac{M_1}{(r-a)^3} - \frac{M_2}{(s-a)^3}$$

$$H_B = H_{BR} - H_{BS} = \frac{M_1}{(r-b)^3} - \frac{M_2}{(s-b)^3}$$

$$H_C = H_{CR} - H_{CS} = \frac{M_1}{(r-c)^3} - \frac{M_2}{(s-c)^3}$$

wherein $H_{AR}$ is the field measured at sensor A caused by the magnetic anomalies introduced by the aircraft; $H_{AS}$ is the field measured at sensor A caused by flux generator 18, etc.

Electrical signals A, B and C are generated at a magnitude representative of the respective fields $H_A$, $H_B$ and $H_C$. These electrical signals are applied to differential amplifiers 25 and 26 and divider 27 as shown in FIG. 2 so that gradiometer signals representative of the following differential fields are generated.

Let $G_1 = H_B - H_C$
$$= M_1\left[\frac{1}{(r-b)^3} - \frac{1}{(r-c)^3}\right] - M_2\left[\frac{1}{(s-b)^3} - \frac{1}{(s-c)^3}\right]$$

Let $G_2 = \dfrac{H_A - H_B}{H_B - H_C}$ $$= \frac{M_1\left[\frac{1}{(r-a)^3} - \frac{1}{(r-b)^3}\right] - M_2\left[\frac{1}{(s-a)^3} - \frac{1}{(s-b)^3}\right]}{M_1\left[\frac{1}{(r-b)^3} - \frac{1}{(r-c)^3}\right] - M_2\left[\frac{1}{(s-b)^3} - \frac{1}{(s-c)^3}\right]}$$

By replacing $M_2$ with the value given in equation (1) and setting $H_{MAD} = 0$, i.e., the value sensed by the $H_{MAD}$ sensor due to the magnetic effects of the aircraft when compensated:

$$G_1 = M_1\left[\frac{1}{(r-b)^3} - \frac{1}{(r-c)^3} - \frac{s^3}{r^3}\left(\frac{1}{(s-b)^3} - \frac{1}{(s-c)^3}\right)\right] \quad (2)$$

$$G_2 = \frac{\frac{1}{(r-a)^3} - \frac{1}{(r-b)^3} - \frac{s^3}{r^3}\left(\frac{1}{(s-a)^3} - \frac{1}{(s-b)^3}\right)}{\frac{1}{(r-b)^3} - \frac{1}{(r-c)^3} - \frac{s^3}{r^3}\left(\frac{1}{(s-b)^3} - \frac{1}{(s-c)^3}\right)} \quad (3)$$

If a compensation signal equal to $G_1 f(G_2)$ is to be applied to the magnetometer head then this compensation signal must equal in magnitude both $M_1/r^3$ and $M_2 s^3$ as the magnetometer is compensated when $(M_1/r^3) - (M_2/s^3) = 0$. Since the compensation signal must equal both $M_1/r^3$ and $M_2/s^3$:

$$M_1/r^3 = G_1 f(G_2) \quad (4)$$

Replace $G_1$ with value given in equation (2).

$$\frac{M_1}{r^3} = M_1\left[\frac{1}{(r-b)^3} - \frac{1}{(r-c)^3} - \frac{s^3}{r^3}\left(\frac{1}{(s-b)^3} - \frac{1}{(s-c)^3}\right)\right] f(G_2)$$

$$f(G_2) = \frac{1}{r^3\left[\frac{1}{(r-b)^3} - \frac{1}{(r-c)^3} - \frac{s^3}{r^3}\left(\frac{1}{(s-b)^3} - \frac{1}{(s-c)^3}\right)\right]} \quad (5)$$

The distance $a$, $b$, $c$ and $s$ are constant and selected by the system designer. The distance $r$ is variable and the compensation function $f(G_2)$ vs. $G_2$ may be computed by using various values or $r$ in equations (3) and (5). A function generator is then designed or programmed depending on the type function generator 30 used to convert the input $G_2$ signals into output $f(G_2)$ signals. As previously mentioned a typical $G_2$ vs. $f(G_2)$ curve is shown in FIG. 3. An alternative method of accomplishing the invention would be to eliminate the flux generator 18 and by means of a differential amplifier subtract the electrical output signal of the multiplier signal from the signal at the MAD detecting head 12. In such a system there would be no $s$ distance and the mathematical treatment would be as follows:

$$H_A = H_{AR} = \frac{M_1}{(r-a)^3}$$

$$H_B = H_{BR} = \frac{M_1}{(r-b)^3}$$

$$H_C = H_{CR} = \frac{M_1}{(r-c)^3}$$

Let
$$G_1 = H_B - H_C = M_1\left(\frac{1}{(r-b)^3} - \frac{1}{(r-c)^3}\right)$$

Let
$$G_2 = \frac{H_A - H_B}{H_B - H_C} = \frac{M_1\left(\frac{1}{(r-a)^3} - \frac{1}{(r-b)^3}\right)}{M_1\left(\frac{1}{(r-b)^3} - \frac{1}{(r-c)^3}\right)} = \frac{\frac{1}{(r-a)^3} - \frac{1}{(r-b)^3}}{\frac{1}{(r-b)^3} - \frac{1}{(r-c)^3}} \quad (6)$$

The field seen at the MAD detecting head is as follows:

$$H_{MAD} = M_1/r^3$$

For compensation:

$$\frac{M_1}{r^3} = G_1 f(G_2)$$

$$f(G_2) = \frac{M_1}{r^3 G_1}$$

$$f(G_2) = \frac{M_1}{r^3 M_1 \left( \frac{1}{(r-b)^3} - \frac{1}{(r-c)^3} \right)}$$

$$f(G_2) = \frac{1}{r^3 \left( \frac{1}{(r-b)^3} - \frac{1}{(r-c)^3} \right)} \quad (7)$$

The term $f(G_2)$ is therefore independent of the magnitude of $M_1$ and can be determined by the equations (6) and (7) as the distance $r$ varies.

In any system using the above teachings care should be taken to ascertain that polarities are kept in mind so that the compensating system neutralizes the magnetic effects of an aircraft and does not add to the magnetic effects.

In addition to the flux gate sensors described above total field sensors can be substituted. One total field sensor will replace an orthogonal set of flux gate sensors. The above single axis analysis is directly applicable. It has therefore been shown a system for eliminating the magnetic effects of an aircraft introduced to MAD system whose function is detecting magnetic anomalies in the earth's surface. This compensation system by the use of three sensors provides elimination of the undesirable magnetic effects of an aircraft when the magnetic field introduced by the aircraft changes in either magnitude or position or both.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A compensation system for neutralizing at a point an axial component of the magnetic field changes introduced by an aircraft along a predetermined axis comprising:

first, second and third sensor means spaced a first, second and third distance from the point for sensing an axial component of total magnetic field along said predetermined axis and generating respectively first, second and third electrical signals indicative of the respective magnitudes of the magnetic fields sensed; and a signal processor having first difference means connected to receive said second and third electrical signals from said second and third sensor means for generating an output signal that is the difference between said second and third electrical signals, second difference means connected to receive said first and second electrical signals from said first and second sensor means for generating an output signal that is the difference between said first and second electrical signals, and operational means connected to receive the output of said first and second difference means for generating an electrical compensating signal for correcting at the point the variation in total magnetic field along said predetermined axis introduced by said aircraft, and magnetic generating means connected to receive said electrical compensating signal for generating a magnetic compensating signal that neutralizes at the point the axial component of the magnetic field changes.

2. A compensation system for neutralizing at a point an axial component of the magnetic field changes introduced by an aircraft along a predetermined axis according to claim 1 wherein said operational means further comprises:

divider means connected to said first and second difference means for generating an output electrical signal that is the quotient of said first and second difference means output signals;

function generator means connected to said divider means for generating an output signal that is a function of the location along said predetermined axis of a fictitious source of the magnetic field changes introduced by said aircraft; and multiplier means connected to said function generator means and said first difference means for generating an output signal that is indicative of the product of said output signal of said function generator means and said output signal of said first difference means.

3. A system for generating an electrical compensating signal indicative of an axial component of the magnetic effects of an aircraft at a point comprising:

first, second and third sensor means spaced a first, second and third distance from the point for sensing an axial component of total magnetic field along a predetermined axis and generating respectively first, second and third electrical signals indicative of the respective magnitudes of the magnetic fields sensed;

an electrical generator having first difference means connected to receive said second and third electrical signals from said second and third sensor means for generating an output signal that is the difference between said second and third electrical signals, second difference means connected to receive said first and second electrical signals from said first and second sensor means for generating an output signal that is the difference between said first and second electrical signals, and operational means connected to receive the output of said first and second difference means for generating the electrical compensating signal.

4. A system for generating an electrical compensating signal indicative of an axial component of the magnetic effects of an aircraft at a point according to claim 3 wherein said operational means further comprises:

divider means connected to said first and second difference means for generating an output electrical signal that is the quotient of said first and second difference means output signals;

function generator means connected to said divider means for generating an output signal that is a function of the quotient of said first and second difference means output signals; and multiplier means connected to said function generator means and said first difference means for generating an output signal that is indicative of the product of said output signal of said function generator means and said output signal of said first difference means.

* * * * *